US007171408B2

(12) United States Patent
Zuzarte

(10) Patent No.: US 7,171,408 B2
(45) Date of Patent: Jan. 30, 2007

(54) METHOD OF CARDINALITY ESTIMATION USING STATISTICAL SOFT CONSTRAINTS

(75) Inventor: Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 10/021,520

(22) Filed: Oct. 30, 2001

(65) Prior Publication Data

US 2003/0084025 A1    May 1, 2003

(30) Foreign Application Priority Data

Oct. 18, 2001 (CA) .................................. 2359296

(51) Int. Cl.
*G06F 7/00* (2006.01)
(52) U.S. Cl. ...................... 707/5; 707/1; 707/2; 707/3
(58) Field of Classification Search .................. 707/29, 707/103, 1–10, 104
See application file for complete search history.

(56) References Cited

U.S. PATENT DOCUMENTS

| 5,761,653 | A | 6/1998 | Schiefer et al. | ................. 702/2 |
| 5,899,986 | A | 5/1999 | Ziauddin | ....................... 707/2 |
| 5,960,428 | A | 9/1999 | Lindsay et al. | ................ 707/4 |
| 5,995,957 | A | 11/1999 | Beavin et al. | .................. 707/2 |
| 6,006,219 | A | 12/1999 | Rothschild | ...................... 707/3 |
| 6,029,163 | A | 2/2000 | Ziauddin | ....................... 707/2 |
| 6,477,523 | B1 * | 11/2002 | Chiang | .......................... 707/2 |

OTHER PUBLICATIONS

Jarke, Bubenko &Jeffery (Eds.), Advances in Database Technoloyg—EDBT '94, 4th International Conference on Extending Database Technology, Cambridge, United Kingdom, Mar. 28-31, 1994 Proceedings, pp. 289-300.
Jornsten and Holm, Cardinality Constrained Decomposition, Journal of Information & Optimization Sciences, vol. 11 (1990) No. 3, pp. 425-442.

(Continued)

*Primary Examiner*—Sam Rimell
*Assistant Examiner*—Mellissa M. Chojnacki
(74) *Attorney, Agent, or Firm*—Sawyer Law Group LLP

(57) ABSTRACT

The present invention provides a method of estimating cardinalities using statistical soft constraints in a relational database management system. The statistical soft constraints are generated from statistical information gathered with respect to virtual columns. The virtual columns are the result of operations involving one or more columns in the database. When a query is received, the database management system determines whether any of the virtual columns are of interest because they involve expressions or relations that are also reflected in the query. The database management system then develops statistical soft constraints from the statistical characteristics of the virtual column and uses those statistical soft constraints to assist in estimating the cardinality of a step in the query plan. The virtual columns may or may not be actually materialized into a column of values.

23 Claims, 2 Drawing Sheets

OTHER PUBLICATIONS

Cheng, Gryz, Koo, Leung, Liu, Qian & Schiefer, Implementation of Two Semantic Query Optimization Techniques in DB2 Universal Database Proceedings of the 25th VLDB Conference, Edinburgh, Scotland, 1999, pp. 687-698.

King, QUIST: A System for Semantic Query Optimization in Relational Databases, Stanford University, Computer Science Department.

Chakravarthy, Grant & Minker, Logic-Based Approach to Semantic Query Optimization, ACM Transactions on Database Systems, vol. 15, No. 2, Jun. 1990, p. 162-207.

O/Neil & Graefe, Multi-Table Joins Through Bitmapped Join Indices, SIGMOD Record, vol. 24, No. 2, Sep. 1995, pp. 8-11.

\* cited by examiner

METHOD OF CARDINALITY ESTIMATION USING STATISTICAL SOFT CONSTRAINTS

FIELD OF THE INVENTION

The present invention relates generally to relational database management systems and more particularly to a method for estimating cardinalities using statistical soft constraints in a relational database management system.

BACKGROUND OF THE INVENTION

A relational database management system provides the interface between a relational database and the users of the database system. Requests for access to the database, including adding or removing data and performing operations on the data, are handled by the relational database management system. The relational database management system includes an optimizer component whose purpose is to efficiently implement user requests for manipulation of data. The optimizer evaluates a user request and attempts to transform it into a more efficient expression of operations based upon an assessment of the cost of performing the operations. The optimizer may develop a set of alternative query plans each implementing the user request with a slightly different set of operational steps or a different ordering of the same set of operational steps. The optimizer must then evaluate the cost of each query plan and select the most efficient plan for fulfilling the user request. One of the principal assessments made by an optimizer in determining cost is the number of rows that will result from an operation. The number of rows at an intermediate stage of a query plan affects the amount of work involved in performing the remainder of the plan. If, for instance, after the first of two operational steps the number of rows of data is reduced from 100 to 3, the second step need only involve the 3 remaining rows. On the other hand, if the first step results in 98 rows of data, the second step involves 98 rows and, therefore, results in a more costly query operation. Accordingly, the estimation of the number of rows that will be involved in, and will result from, each operational step in the query plan is important in accurately estimating the cost of a query plan. The estimation of the number of distinct rows in a column is called "cardinality estimation".

When a complex query involves multi-column predicates, it is difficult to estimate cardinality without having some knowledge about the relationship between the columns. For example, if a table contained a column for start date and a column for end date, a query may be made to find the number of projects active on a given day. The predicate that could be used is "WHERE START_DATE<='1995-08-30' AND END_DATE>='1995-08-30'". One technique used is to treat the columns independently and multiply the selectivities of the individual predicates. If it were known that 1995-08-30 was approximately in the middle of the column of values that spanned 10 years of data, each predicate would have a selectivity of about 50%. In other words, it would be true for half of the rows that the START_DATE is less than or equal to 1995-08-30 and it would be true for half of the rows that the END_DATE is greater than 1995-08-30. This would lead to a combined estimate of 25% of all projects started over the ten year period having been active on the date 1995-08-30. If projects rarely lasted more than a month, then this estimate would be far too high. If projects typically lasted five or more years, then perhaps the estimate would be too low. Without knowing more information about the relationship between the START_DATE and the END_DATE, we cannot accurately estimate the cardinality of multiple predicates on different columns.

Similarly, if a single predicate involves multiple columns, such as the predicate WHERE (END_DATE-START_DATE)<=5, the cardinality of this predicate is difficult to assess without statistical information about the relationship between these two columns.

Another situation in which cardinality estimation is difficult is where the predicate involves an expression. For instance, a predicate may wrap a single column in a function, such as "f1(C1)=10". Even if we know a great deal about the column itself, it would be impossible to estimate the cardinality of this predicate without knowing more about the effect that the function would have upon the column.

Accordingly, it would be advantageous if the query optimizer was provided with statistical information regarding the relationship between columns and statistical information regarding the effect of a function or expression upon a column for use in estimating the cardinality of predicates.

One existing source of relational information regarding the data is integrity constraints. A database may be subject to any number of integrity constraints of arbitrary complexity. An integrity constraint (also called a business rule) describes a condition about the database that must be true. It is a declarative statement that the relational database management system must ensure remains true. When an update operation is performed, the relational database management system checks the integrity constraints to ensure the operation will not violate an integrity constraint. An example of an integrity constraint, in the case of a database containing educational test scores, could be that the test score cannot be less than zero or greater than one hundred.

Imposing integrity constraints upon a database can be costly in itself because the relational database management system must check the integrity constraint with each update of the database. In addition, many potentially useful integrity constraints for a database may not be known. Finally, even if there is a useful statistical expression that characterizes a database, there may be no justification for imposing a constraint that forces that characterization to remain true.

Accordingly, it would be advantageous to have a method of creating and maintaining statistical expressions that contain statistical information on relationships between columns in a database and assist in query optimization without requiring that the expressions remain true or be evaluated with each update to the database. Similarly, it would also be advantageous to have a method of creating and maintaining statistical expressions that contain statistical information regarding the effect of functions or expressions upon columns in a database for the same purpose.

BRIEF SUMMARY OF THE INVENTION

The present invention provides a method for using statistical constraints to assist in estimating the cardinality of predicates by an optimizer of a relational database management system. In a first aspect, the present invention provides a method, for use in query optimization in a relational database management system, the method including the steps of generating statistical information regarding data that would be produced by an operation involving one or more columns of a database, generating a statistical soft constraint using the statistical information that reflects a statistical property of the data, and using the soft statistical constraint to estimate a cardinality value for the result of applying one or more query predicates in a query plan.

In another aspect, the present invention provides a method, for use in query optimization in a relational database management system, the method including the steps of generating a virtual column, wherein the virtual column comprises the results of an operation involving one or more columns of a database, generating a statistical soft constraint that reflects a statistical property of the virtual column, and using the statistical soft constraint to estimate a cardinality value for the result of applying one or more query predicate in a query plan.

In yet another aspect, the present invention provides a database management system including means for generating statistical information regarding data that would be produced by an operation involving one or more columns of a database, means for generating a statistical soft constraint using the statistical information, and means for utilizing the statistical soft constraint to estimate a cardinality value for the result of applying one or more query predicates in a query plan.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

The present invention relates generally to relational database management systems and more particularly to a method for estimating cardinalities using statistical soft constraints in a relational database management system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
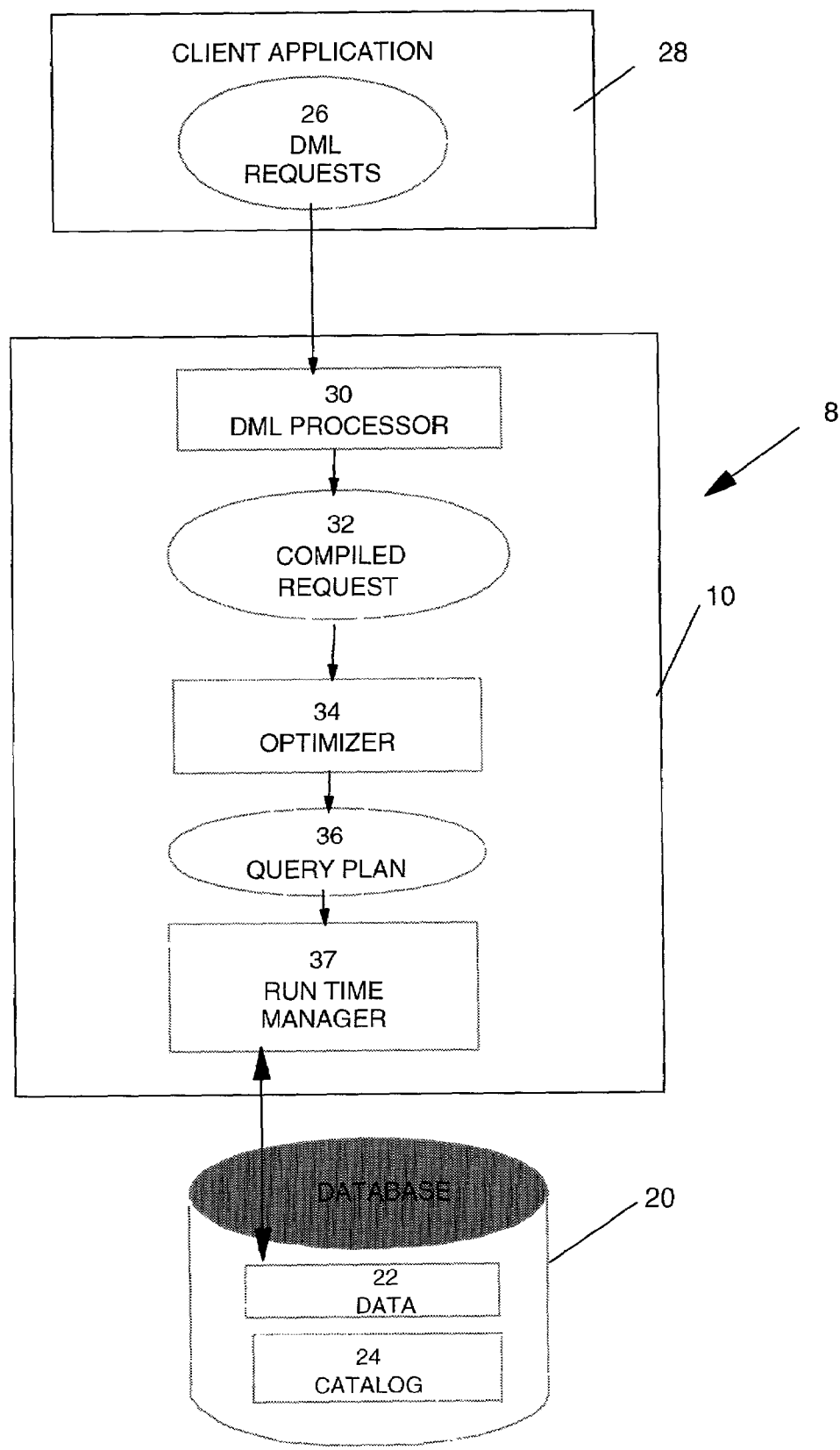
FIG. 1 is a block diagram that shows the component elements of a relational database management system that would implement a method according to the present invention.

Reference is made to FIG. 1 which shows in block diagram form a Relational Database Management System (RBDMS) 8 implemented upon a server 10. The RBDMS 8 includes a database 20 which contains data 22 and a catalog 24. The catalog 24 contains information about the data 22 and its format, including schemas, mappings, security constraints, integrity constraints and other definitions or objects.

The RDBMS 8 receives requests 26 from a client application 28. The request 26 could be to update, retrieve, delete or manipulate the existing data 22 or to add new data to the database 20. The request 26 is written in a data manipulation language (DML), such as SQL. In order to understand this request 26, the RDBMS 8 includes a DML processor 30. The DML processor 30 produces a compiled request 32 which is passed to an optimizer 34. The optimizer 34 determines an efficient manner of implementing the request 26 and produces an optimized request, also known as a query plan 36. The query plan 36 is then executed by a run time manager 37 and, if appropriate, the results are returned to the client application 28. The architecture and operation of RDBMS systems, and the possible variations, will be well understood by those skilled in the art.

The optimizer 34 performs a number of functions to create the query plan 36 including query transformation, choosing low-level procedures, generating candidate query plans and estimating costs. The function of estimating the cost of various candidate query plans involves cardinality estimation to determine the number of rows anticipated to result from or be included in each operation in the query plan.

According to one aspect, the present invention collects and uses statistics for "virtual columns", which are the columns that result from expressions involving one or more actual columns. For example, a virtual column could be the column of values resulting from the operation C1–C2. Statistical information regarding a virtual column can be generated just as for an actual column. For example, statistical information can be gathered regarding the high and low values, the cardinality, the frequency of values and histogram statistics. From these statistics, the RDBMS can create statistical constraints that reflect a characteristic of the virtual column. For example, the RDBMS could determine that C1–C2=10 for 40% of the rows, and that C1–C2=0 for 25% of the rows. Statistical constraints can then be used by the query optimizer to assist in estimating cardinalities. If the optimizer is evaluating a query plan that involves a predicate like C1–C2=10 or C1–C2>=30, the statistical information gathered from the virtual column can be exploited by the RDBMS to generate temporary statistical constraints for use in estimating cardinality.

Statistical constraints are different from ordinary integrity constraints in that they are not necessarily valid for all of the data. Accordingly, they may be referred to as statistical soft constraints (SSCs). In addition, SSCs include an extra piece of information along with the expression expected in an ordinary integrity constraint. Each SSC incorporates a value that reflects the percentage of the rows for which the expression can be expected to be true. For example, an SSC may be expressed as C1–C2=10 [40%], meaning that two-fifths of the rows can be expected to yield the result C1–C2 equals 10. Similarly, the RDBMS could generate SSCs involving range operators from histogram statistics, such as C1–C2>10 AND C1–C2<=20 [10%]. The RDBMS may also generate SSCs based on a single column manipulated by an expression or function. Such an SSC could take the form F1(C1)=10 [25%], or F1(C2)>=50 [90%].

Figure 2:
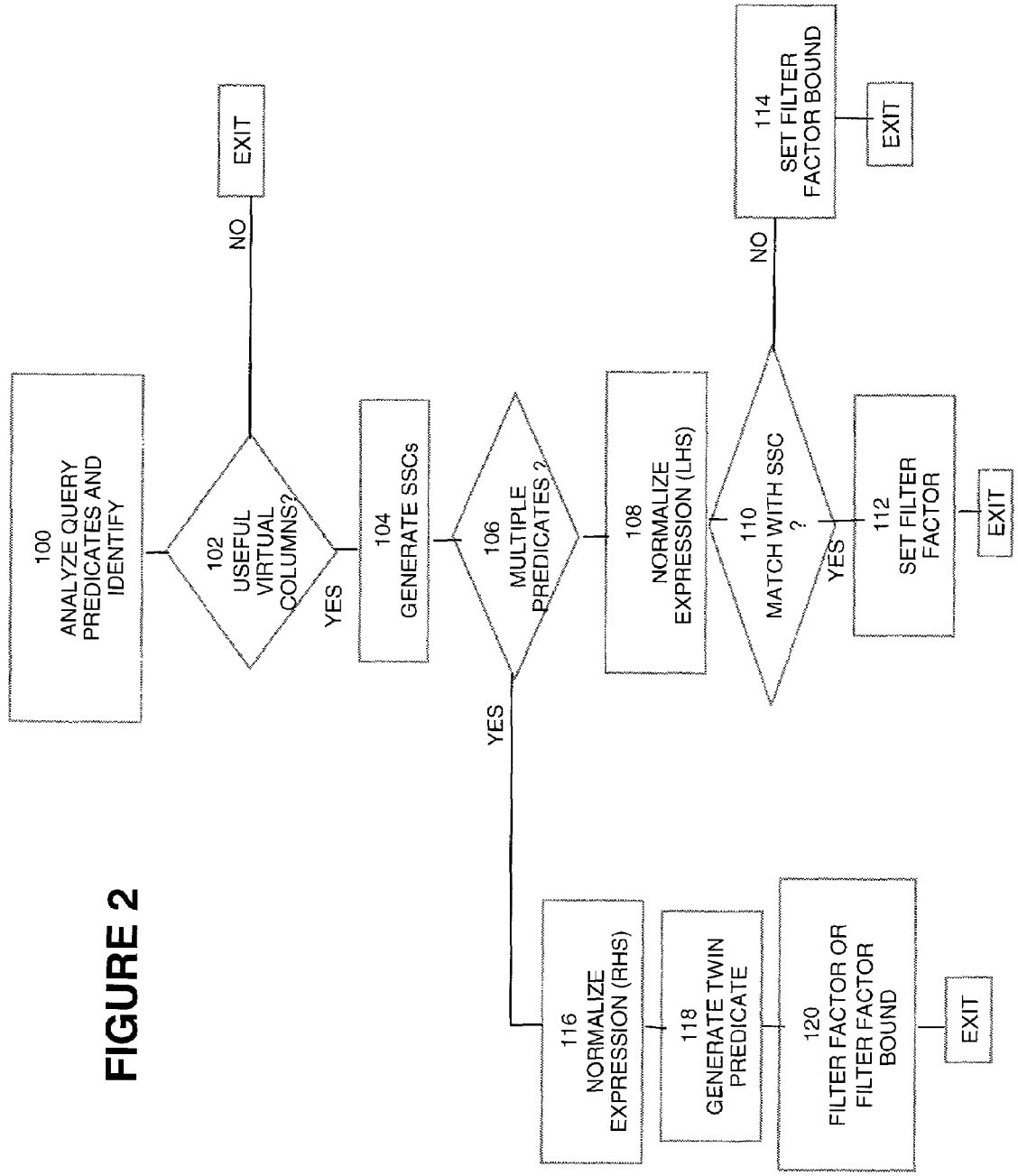
FIG. 2 is a flowchart illustrating the steps performed by an optimizer to generate and use statistical soft constraints to assist in estimating cardinality in accordance with the present invention.

Reference is now made to FIG. 2, which shows a flowchart illustrating a method employed by the RDBMS 8 (FIG. 1) to estimate cardinalities in accordance with the present invention.

The optimizer 34 (FIG. 1) of the RDBMS 8 (FIG. 1) begins the method in step 100 by analyzing the query predicates and identifying those predicates that are of a form that lends itself to application of the method. The predicates that the optimizer 34 (FIG. 1) identifies are (a) predicates involving multiple columns, such as C1–C2>=5; (b) predicates involving expressions, such as F1(C1)=5; and (c) multiple predicates on different columns, such as C1>=5 AND C2<=20. These three types of predicates cause cardinality estimation problems for the optimizer 34 (FIG. 1) because, in the case of the first and third types, there may be a dependent relationship between the two columns and, in the case of the second type, it involves operations upon a column.

Once the query predicates have been analyzed and one or more candidate predicates of one of the above three types of predicates has been identified, then the optimizer 34 (FIG. 1) performs the steps beginning at step 102 for each candidate predicate. At step 102, the optimizer 34 (FIG. 1) reviews the available virtual columns and determines if any of the virtual columns will be useful in estimating the cardinality of the candidate predicate. Useful virtual columns will be those virtual columns based upon an identical or similar expression to that contained in the candidate predicate or those virtual columns that describe a relationship between two columns contained in a multiple column candidate predicate or multiple candidate predicates. The virtual columns that will be useful in cardinality estimation will be apparent from the following description of the method. In the event there are no useful virtual columns for assisting in cardinality estimation, the optimizer exits the method to continue its normal operation.

Once a useful virtual column has been identified, then at step 104 the optimizer 34 (FIG. 1) uses statistical information corresponding to the virtual column to generate one or more SSCs for use in cardinality estimation. For example, if the candidate query predicate C1–C2=5 were identified at step 100, then at step 102 a virtual column corresponding to C1–C2 would be identified as a useful virtual column. At step 104, the optimizer 34 (FIG. 1) would consider the statistical information gathered in connection with the virtual column and generate SSCs based upon the statistics. For example, the statistical information may indicate that the value 5 has a frequency of 10% in the virtual column. From this information, an SSC would be created of the form: C1–C2=5 [10%]. Or, from the histogram statistics, one may find that 18% of the values of the virtual column are in the range 1 to 5, in which case the SSC generated would be of the form C1–C2>0 AND C1–C2<=5 [18%].

After generating SSCs, the optimizer 34 (FIG. 1) considers, at step 106, whether the candidate predicate is of the third type, i.e. multiple predicates on different columns. If it is, then the optimizer 34 (FIG. 1) proceeds to step 116; otherwise, it proceeds to step 108. At step 108, the optimizer 34 (FIG. 1) performs left-hand side normalization upon the candidate predicate and the SSCs, if necessary. This manipulates the candidate predicate expression and the SSCs into a common format in which the constant is on the right-hand side. Not all candidate predicates or SCCs will require this normalization, since some may already be written in left-hand side form. However, if the candidate expression is in the form C1=C2+5, it is normalized in step 108 to become C1–C2=5.

Once the candidate predicate and the SSCs are in the left-hand side normalized form, the optimizer 34 (FIG. 1) reviews the SSCs in step 110 to determine if there is a match with the candidate predicate. For example, an SSC such as C1–C2=5 [10%] would be a match to the candidate predicate C1–C2=5. In such a case, the optimizer 34 (FIG. 1) proceeds to step 112, and sets a selectivity based directly upon the SSC. For example, with the SSC C1–C2=5 [10%], the selectivity would be 0.10. The term "selectivity" is the probability that rows will satisfy the predicate and is used to estimate cardinality. Note that the term filter factor is sometimes used in this context. The selectivity for a predicate is multiplied with the cardinality of the table to arrive at the estimated cardinality after the predicate has been applied. In the case of the query predicate C1–C2=5 with a selectivity of 0.10 and given a table containing, say, 10,000 rows, then the estimated cardinality after applying the predicate would be 10,000*0.10=1000.

In many cases, there may not be an exact match between a candidate predicate and an SSC upon which to base the selectivity. In such a case, the optimizer 34 (FIG. 1) proceeds to step 114, where it sets a selectivity boundary based upon the information provided by the SSCs. For example, in the case where the query predicate is C1–C2=5, if we have a SSC that indicates that C1–C2<5 [90%] then the optimizer 34 (FIG. 1) knows that the maximum selectivity is 0.10. With further information, such as an SSC like C1–C2<10 [95%], the optimizer 34 (FIG. 1) would set the maximum selectivity to 0.05. Accordingly, even where the statistics for a virtual column do not lead to an exact measure of expected cardinality for a query predicate, they can greatly assist in providing accurate boundaries for selectivity. Alternatively, suitable interpolation could be used, in a manner similar to what is commonly used with single column histogram statistics, as will be understood by those skilled in the art.

After setting the selectivity or selectivity bound, the optimizer 34 (FIG. 1) exits the method to resume normal operation. The optimizer 34 (FIG. 1) will use the selectivity or selectivity bound and the cardinality of the table from which the SSC was derived to calculate the estimated cardinality. This cardinality estimate will be used in conjunction with the cardinality estimate for each other query predicate in the query plan to assess the overall efficiency of the query plan. Once the efficiency of each query plan is assessed, the optimizer 34 (FIG. 1) will select the most efficient plan for execution of the query request.

Referring still to FIG. 2, when the candidate predicate involves the third type of query predicate, namely multiple predicates upon different columns, at step 116 the optimizer 34 (FIG. 1) performs a different normalization operation from that done in step 108. In step 116, the optimizer 34 (FIG. 1) normalizes the SSC to the right-hand side, if necessary, such that one column is expressed in terms of the other. For example, if the candidate predicates are C1>=5 AND C2<=20 and the SSC is C1–C2=3 [90%], then at step 116 the SSC will be rewritten as C1=C2+3 [90%].

From step 116, the optimizer 34 (FIG. 1) generates a twin predicate in step 118 wherein it substitutes occurrences of one column using the normalized SSC, such that the candidate predicates involve only one column. Using the above example, the candidate predicate C1>=5 would be twinned with the normalized SSC to become C2+3>=5. This may then be transposed to yield the predicate C2>=2.

The optimizer 34 (FIG. 1) then, in step 120, uses the twin predicate and the unaltered candidate predicate to determine the combined selectivity. In the above example, the predicates used to determine the selectivity or selectivity bound would be expressed entirely in terms of C2; namely, C2>=2 AND C2<=20. Accordingly, using statistics generated for the column C2, the optimizer 34 (FIG. 1) would be able to obtain probabilities that the values of C2 are less than or equal to 20 and that the values are more than or equal to 2. Considering that the SSC C1=C2+3 [90%] has a high probability, it is highly likely that the selectivity of C1>=5 is close to that of C2>=2. Accordingly, we may assume that the selectivity of C1>=5 is the same as the selectivity of C2>=2, although a suitable statistical error could be applied to adjust the selectivity of C2>=2 based upon the probability of the SSC.

Assuming that the selectivity of C1>=5 and, therefore, C2>=2 is 0.50, and that the selectivity of C2<=20 is 0.60, we may calculate a selectivity for the combined predicates C1>=5 AND C2<=20. Knowing that 0.50 of column C2 is greater than or equal to 2 and that 0.60 of column C2 is less than or equal to 20, we may conclude that the combined predicate has a selectivity of (0.50+0.60−1.00)=0.10. In other words, because half of C2 is less than 2 and forty percent of C2 is greater than 20, only ten percent of C2 satisfies both criteria.

Using conventional cardinality estimation with the above example would result in a considerably different estimate, due to ignorance of the relationship between C1 and C2. The conventional method would involve multiplying the selectivities for the two predicates together to get 0.50*0.60=0.30, which is three times the estimate produced above.

The choice of what virtual columns to generate and store can be made by a database administrator on an ad hoc basis. Alternatively, an advisor component of the RDBMS may be employed to monitor search queries during operation of the database and select potentially useful virtual columns for future queries based upon a history of queries. The advisor would sort through predicates used in past queries to determine the combination of columns that appears most frequently and in what relationship. In particular, the advisor would identify scalar or casting functions wrapped around columns, since these are particularly difficult relationships to manage in cardinality estimation.

Another alternative source for identifying potentially helpful virtual columns is data mining. The data itself may be analyzed by an advisor component to identify relationships between columns.

Once potentially useful virtual columns are identified, they could be added to the table as materialized columns. In this case, statistics would be collected regarding the materialized columns as with any other column. The query need not refer directly to the materialized column, as the optimizer 34 (FIG. 1) will recognize if the materialized column is useful in cardinality estimation for any particular query. The implementation of various methods of generating and storing materialized columns will be understood by those skilled in the art.

An alternative method is to store virtual columns as special attachments to the table in the catalog. The virtual columns are tagged to differentiate them from normal columns containing data. Statistics on the virtual columns may be collected either as an extension of the existing statistics collection routines, wherein the values for each row in the virtual column would be generated as a part of the statistics collection expression, or through SQL statements.

For example, one could use suitable grouping counts to determine the probabilities using a snapshot of the data. To develop a virtual column regarding the length of stay of hotel guests, the expression (DEPARTURE_DATE-ARRIVAL_DATE) may be used in connection with the table GUEST_TABLE. The following query may be used:
SELECT (DEPARTURE_DATE-ARRIVAL_DATE) AS LENGTH_OF_STAY, COUNT(*) FROM GUEST_TABLE
GROUP BY (DEPARTURE_DATE-ARRIVAL DATE)

The above query would produce the number of guests who stayed for 1 day, 2 days, 3 days, and so on. These results are suitable input as statistics for a virtual column, which does not require actually storing and maintaining these values in GUEST_TABLE. If the resulting statistics from such an expression were too large, a suitable expression could be used to develop histogram statistics.

Using the foregoing specification, the invention may be implemented as a machine, process or article of manufacture by using standard programming and/or engineering techniques to produce programming software, firmware, hardware or any combination thereof. Any resulting computer program(s), having computer readable program code, may be embodied within one or more computer usable media, including storage devices thereby constituting a computer program product, article of manufacture according to the invention.

A machine embodying the invention may involve one or more processing systems including, but not limited to, central processing units, memory/storage devices, communication links, communication/transmitting devices, servers, I/O devices, local networks, the Internet, or any subcomponents or individual parts of one or more processing systems, including software, firmware, hardware or any combination or subcombination thereof, which embody the invention as set forth in the claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method, for use in query optimization in a relational database management system in a computer system, said method comprising:
   (a) generating statistical information regarding data which represents the results of an operation involving one or more columns of a database;
   b) deriving a statistical soft constraint from said statistical information that reflects a statistical property of said data, wherein said statistical soft constraint comprises a value that reflects the percentage of the rows for winch an expression can be expected to be true; and
   (c) using said statistical soft constraint to estimate a cardinality value for the result of applying one or more query predicates in a query plan.

2. The method of claim 1 further comprising the step, prior to step (a), of creating a materialized column containing said data, wherein said data comprises the results of said operation involving one or more columns of a database.

3. The method of claim 2 wherein said materialized column is stored in the database.

4. The method of claim 2 wherein said statistical soft constraint comprises a constraint predicate and an associated probability value, said associated probability value reflecting the percentage of rows of said one or more columns for which said constraint predicate is true.

5. The method of claim 2 wherein said step of generating statistical information comprises gathering said statistical information regarding said data utilizing a statistics gathering process provided by the relational database management system.

6. The method of claim 1 wherein the step of generating statistical information comprises analyzing the data using an SQL statement.

7. The method of claim 6 wherein said SQL statement groups a selection to obtain frequencies.

8. The method of claim 1 further comprising the step, prior to step (b), of analyzing said statistical information and determining a useful subset of said statistical information from which to derive said statistical soft constraint.

9. A method, for use in query optimization in a relational database management system in a computer system, said method comprising the steps of:
   (a) generating statistical information regarding data which represents the results of an operation involving one or more columns of a database;
   (b) deriving a statistical soft constraint from said statistical information that reflects a statistical property of said data, wherein said statistical soft constraint comprises a constraint predicate and an associated probability value, said associated probability value reflecting the percentage of rows of said one or more columns for which said constraint predicate is true; and
   (c) using said statistical soft constraint to estimate a cardinality value fur the result of applying one or more query predicates in a query plan.

10. The method of claim 9 wherein said query predicate comprises an expression involving two different columns.

11. The method of claim 10 wherein the step (c) of using said statistical soft constraint comprises the steps of:
   (c1) normalizing said query predicate, if necessary, such that the right-hand side of said query predicate expression comprises a constant;
   (c2) determining whether said query predicate matches said constraint predicate;
   (c3) setting a selectivity for said query predicate equal to said associated probability value if said query predicate matches said constraint predicate; and
   (c4) setting a selectivity boundary for said query predicate based upon said associated probability value if said query predicate does not match said constraint predicate.

12. The method of claim 9 wherein said query predicate comprises an operation upon a column.

13. The method of claim 12 wherein the step (c) of using said statistical soft constraint comprises the steps of:
   (c1) normalizing said query predicate, if necessary, such that the right-hand side of said query predicate expression comprises a constant;
   (c2) determining whether said query predicate matches said constraint predicate;
   (c3) setting a selectivity for said query predicate equal to said associated probability value if said query predicate matches said constraint predicate; and
   (c4) setting a selectivity boundary for said query predicate based upon said associated probability value if said query predicate does not match said constraint predicate.

14. The method of claim 9 wherein said query predicate comprises two predicates, the first predicate involving a first column and the second predicate involving a second column, said first column being a different column from said second column, wherein said constraint predicate comprises and expression including said first column and said second column.

15. The method of claim 13 wherein the step (c1) of using said statistical soft constraint comprises the steps of:
   (c1.1) normalizing said constraint predicate, if necessary, to produce a normalized constraint predicate wherein the left-hand side of said normalized constraint predicate comprises said first column;
   (c1.2) substituting occurrences of said first column in said first predicate with the right-hand side of said normalized constraint predicate, such that said first predicate only refers to said second column;
   (c1.3) transposing said first predicate, if necessary, to produce a transposed first predicate wherein the left-hand side of said transposed first predicate comprises said second column; and
   (c1.4) setting a selectivity or selectivity bound based upon said transposed first predicate, said second predicate and statistical information regarding said second column.

16. A database management in a computer system comprising:
   means for generating statistical information regarding data which represents the results of an operation involving one or more columns of a database;
   means for generating a statistical soft constraint using said statistical information; wherein said statistical soft constraint comprises a value that reflects the percentage of the rows for which an expression can be expected to be true; and
   means for utilizing said statistical soft constraint to estimate a cardinality value for the result of applying one or more query predicates in a query plan.

17. The database management system of claim 16 wherein said statistical soft constraint comprises a constraint predicate and an associated probability value reflecting the percentage of rows of said one or more columns for which said constraint predicate is true.

18. The database management system of claim 17 wherein said means for utilizing comprises:
   means for identifying a type of said query predicate;
   means for normalizing said query predicate and said constraint predicate;
   means for comparing said query predicate with said constraint predicate;
   means for setting a selectivity equal to said probability value when said query predicate matches said constraint predicate; and
   means for setting a selectivity bound based upon said probability value when said query predicate does not match said constraint predicate.

19. The database management system of claim 16 wherein said query predicate comprises a first and second predicate.

20. The database management system of claim 19 wherein said means for utilizing further comprises:
   means for generating a twin predicate from said first predicate; and
   means for setting a selectivity or selectivity bound based upon said twin predicate, said second predicate and said probability value.

21. A computer program product comprising:
   (a) a computer readable medium;
   (b) code means contained in said medium for instructing a computer to perform the steps of:
      (i) generating statistical information regarding data which represents the results of an operation involving one or more columns of a database;
      (ii) deriving a statistical soft constraint from said statistical information that reflects a statistical property of said data, wherein said statistical soft constraint comprises a value that reflects the percentage of the rows for which an expression can be expected to be true; and
      (iii) using said statistical soft constraint to estimate a cardinality value for the result of a query predicate in a query plan.

22. The computer program product of claim 21 wherein said computer readable medium is chosen from the group consisting of a magnetic storage medium and an optical storage medium.

23. A computer readable medium containing program instructions for use in query optimization in a relational database management system, said program instructions for:
   (a) generating statistical information regarding data which represents the results of an operation involving one or more columns of a database;
   (b) deriving a statistical soft constraint from said statistical information that reflects a statistical property of said data, wherein said statistical soft constraint comprises a value that reflects the percentage, of the rows for which an expression can be expected to be true; and
   (c) using said statistical soft constraint to estimate a cardinality value for the result of applying one or more query predicates in a query plan.

* * * * *